Patented July 13, 1943

2,323,980

UNITED STATES PATENT OFFICE 2,323,980

MANUFACTURE OF ORGANIC COMPOUNDS

Henry Dreyfus, London, England, assignor to Celanese Corporation of America, a corporation of Delaware No Drawing. Application May 8, 1941, Serial No. 392,494. In Great Britain June 4, 1940

4 Claims. (Cl. 260—459)

This invention relates to the manufacture of certain organic products, including products which are of great value as textile assistants.

According to the present invention alcohols are, by the action of heat, caused to react with acid salts of amines with inorganic polybasic acids. The term "polybasic acid" is used as including a dibasic acid.

The nature of the product obtained depends upon the reaction conditions. Usually the products appear to be amine salts of those organic acids which can be regarded as derived from polybasic inorganic acids by exchange of an acidic hydrogen atom or an acidic hydroxy group for an organic radicle. In general, when an amine sulphate is employed, the reaction results in a good yield of the amine salt of the acid sulphate of the alcohol employed. However, the reaction can be carried further, for example by heating to higher temperatures than are required to obtain the amine salts of the alcohol acid sulphates so as to obtain different products which appear to be amine salts of sulphonic acids.

For example, if lauryl alcohol is heated with the acid sulphate of N-diethyl ethylene diamine at 130 to 170° C., e. g. at about 150° C. a good yield of the diethyl ethylene diamine salt of lauryl sulphate is obtained. If, however, the heating is conducted at a temperature of about 200 to 220° C. the product appears to be the diethyl ethylene diamine salt of a sulphonic acid.

The reaction between the alcohol and the amine salt is advantageously conducted under conditions such that any water present, or produced in the course of reaction, is removed. To this end temperatures well above 100° C. e. g. 130° C. to 150° C. or higher can be employed, and the water allowed to distil. Further, the heating can be effected under vacuum whereby the removal of water is facilitated.

The new reaction proceeds particularly readily when the alcohol is a higher fatty alcohol, for example lauryl, cetyl, stearyl or other higher saturated fatty alcohols or oleyl or other unsaturated fatty alcohols. From the point of view of producing textile assistants especially useful results are obtained with alcohols containing eight or more carbon atoms, and particularly with those containing twelve or more carbon atoms.

Other types of alcohol can, however, be used, for example, lower aliphatic alcohols, such as ethyl, propyl or butyl alcohols, and also cyclic alcohols, for example cyclohexanol or methyl cyclohexanol. Alcohols having boiling points substantially above 100° C., for example alcohols of boiling point of 130° C. or more, are generally to be preferred.

The new reaction proceeds particularly readily with acid sulphates of organic amines. However, amine acid salts of other inorganic polybasic acids may be employed, for example amine acid salts of phosphoric acid or thiophosphoric acid.

As regards the amines from which the acid amine salts are derived it is preferred that these should be such as contain aliphatic amino groups, i. e. amino groups which are not directly attached to an aromatic nucleus. For example, aliphatic amines or cyclo aliphatic amines, whether primary, secondary, or tertiary, can be employed as acid salts of polybasic acids. It is also desirable that the amines should be of fairly high boiling point, for example a boiling point above 100° C. For example they can be alkyl amines of this character, e. g. di- or tri-n-butylamine and di- or tri-isoamylamine, or cyclohexyl amines, e. g. cyclohexylamine itself or mono- or di-methyl or mono- or di-ethyl cyclohexylamine. Again, they can be amines containing at least two aliphatic amino groups. Examples of such are alkylene diamines, e. g. ethylene diamine, alpha-beta- and alpha-gamma-diaminopropane, and hexamethylene diamine, also the N.alkyl derivatives of these diamines. Very good results are obtained when the amine is symmetrical or unsymmetrical diethyl ethylene diamine or a mixture of these amines.

The new process is conveniently carried out by heating the acid salt of the amine with the alcohol, the latter being present in excess of the amount equivalent to the acid salt of the amine. The product will then usually contain free alcohol in addition to the desired amine salt. This, however, is an advantage in many cases, as for example when making amine salts of higher fatty alkyl sulphates by the new process. These latter compounds are useful for incorporating in lubricants for textile materials and the presence of some free higher fatty alcohol facilitates the incorporation of the salt with the oil of the lubricant.

If desired, the mixture of reactants used in carrying out the new process can be obtained by simply mixing together the amine, the sulphuric or other polybasic acid, and the alcohol.

The invention has been described in connection with the production of salts of organic bases. According to a further feature of the invention analogous salts of inorganic bases, for example those of the alkalies, are produced by substituting the appropriate acid salt of the said inorganic base for the acid salt of the organic base specified above. Thus the mono-alkali-metal or mono ammonium salts of sulphuric acid can be employed.

The invention is illustrated by the following example, the "parts" referred to being parts by weight.

Example 40.5 parts of sulphuric acid (97% strength) are stirred into 39.5 parts of an aqueous solution of N-diethylethylenediamine of 59.3% strength, the temperature being kept below 30° C. Thereafter 112 parts of lauryl alcohol are added and the mixture heated for 4 hours under a pressure of 15 mm. of mercury. During this heating water and a small proportion of the lauryl alcohol distils off. The product is then rendered slightly alkaline to litmus by addition of more of the diethyl ethylenediamine. When cold the product is a soft amber-coloured mass consisting substantially of N-diethylethylenediamine lauryl sulphate together with some lauryl alcohol and small proportions of the diethylethylenediamine and its sulphate.

The N-diethylethylenediamine referred to in the above example is a product consisting substantially of symmetrical and unsymmetrical N-diethylethylenediamines and obtained by ethylating ethylenediamine with ethyl chloride in presence of alcohol.

Similarly salts of inorganic bases can be prepared by heating alcohols with acid sulphates of inorganic bases. For instance sodium lauryl sulphate can be prepared by heating 3 parts of lauryl alcohol with 2 parts of finely powdered sodium hydrogen sulphate at 150° C. for 3 to 4 hours under a pressure of 15 mm. of mercury. The product is then stirred with 3 parts water, rendered slightly alkaline to litmus by addition of aqueous caustic soda solution, and water distilled off by heating under a pressure of 15 mm. of mercury until the temperature reaches 110° C. The residue is boiled with 10 parts of methylated spirit under reflux for 2 hours, the spirit solution filtered from sodium sulphate, and the spirit removed by distillation. The product is a mixture consisting substantially of sodium lauryl sulphate and free lauryl alcohol. It is a valuable textile assistant.

Having described my invention, what I desire to secure by Letters Patent is:

1. Process for the production of an amine salt of an acid sulphate of an alcohol, which comprises heating together at 130–170° C. a fatty alcohol containing at least 12 carbon atoms and the acid sulphate of N-diethyl-ethylene diamine.

2. Process for the production of an amine salt of an acid sulphate of an alcohol, which comprises heating together the alcohol and the acid sulphate of an alkylene diamine having a boiling point above 100° C.

3. Process for the production of an amine salt of an acid sulphate of an alcohol, which comprises heating together the alcohol and the acid sulphate of N-diethyl-ethylene diamine.

4. Process for the production of the N-diethyl-ethylene diamine salt of the acid sulphuric ester of lauryl alcohol, which comprises heating the lauryl alcohol with the acid sulphate of N-diethyl-ethylene diamine at a temperature of 130–170° C.

HENRY DREYFUS.